US012769987B2

(12) United States Patent
Tayeb

(10) Patent No.: US 12,769,987 B2
(45) Date of Patent: Oct. 20, 2026

(54) SYNCHRONIZATION SYSTEM FOR GENERATIVE ARTIFICIAL INTELLIGENCE RECOMMENDATION SYSTEMS

(71) Applicant: INTUIT INC., Mountain View, CA (US)

(72) Inventor: Yaakov Tayeb, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 464 days.

(21) Appl. No.: 18/415,381

(22) Filed: Jan. 17, 2024

(65) Prior Publication Data

US 2025/0232159 A1 Jul. 17, 2025

(51) Int. Cl.
*G06N 3/00* (2023.01)
*G06N 3/0475* (2023.01)
*G06N 3/08* (2023.01)

(52) U.S. Cl.
CPC ............. *G06N 3/0475* (2023.01); *G06N 3/08* (2013.01)

(58) Field of Classification Search
None
See application file for complete search history.

(56) References Cited

U.S. PATENT DOCUMENTS 11,742,076 B2 * 8/2023 Banerjee .................. G06N 3/08 706/25
12,530,576 B2 * 1/2026 Menon ..................... G06N 3/08
2012/0136219 A1 * 5/2012 Huang ...................... G06N 5/00 600/300
2018/0048599 A1 * 2/2018 Arghandiwal ........ H04L 51/216
2018/0220061 A1 * 8/2018 Wang ........................ G06N 3/02
2019/0236204 A1 * 8/2019 Canim ................ G06F 16/3329
2023/0282126 A1 * 9/2023 Coppersmith, III ......................... G06F 3/04847
2023/0317246 A1 * 10/2023 Dhillon ................ A61B 5/0077 705/2
2023/0360772 A1 * 11/2023 Manteau-Rao ......... G06F 3/167

(Continued)

FOREIGN PATENT DOCUMENTS

EP 3276617 A1 * 1/2018 ............. G10H 1/368
JP 2025000511 A * 1/2025

OTHER PUBLICATIONS

"Personalize Your Content Recommendations with ChatGPT", AI & Insights, https://medium.com/@AlandInsights/personalize-your-content-recommendations-with-chatgpt-dbc7f9d59877, Apr. 29, 2024, pp. 1-7.

(Continued)

*Primary Examiner* — Hasanul Mobin
(74) *Attorney, Agent, or Firm* — DLA PIPER LLP US

(57) ABSTRACT

Systems and methods for a tunable synchronization network configured to facilitate communication between recommendation systems and generative artificial intelligence systems to generate custom content that is unique to each user. The systems and methods leverage a novel framework including a natural language processing transformer that includes a synchronization layer that can trained to generate profile vectors and a vector translator configured to translate intensity values from profile vectors cells to generate prompts for generative artificial intelligence systems. Notably, this novel framework is agnostic to both the recommendation systems and generative artificial intelligence systems that are used.

16 Claims, 9 Drawing Sheets

(56) References Cited

U.S. PATENT DOCUMENTS

| | | | | |
|---|---|---|---|---|
| 2024/0038222 | A1* | 2/2024 | Chaar | G06Q 10/1093 |
| 2025/0232159 | A1* | 7/2025 | Tayeb | G06N 3/08 |

OTHER PUBLICATIONS

Batmaz et al. "A review on deep learning for recommender systems: challenges and remedies", Artificial Intelligence Review, Aug. 29, 2018, 37 pages.

* cited by examiner

SYNCHRONIZATION SYSTEM FOR GENERATIVE ARTIFICIAL INTELLIGENCE RECOMMENDATION SYSTEMS

BACKGROUND

Automated recommendation systems are digital platforms, utilizing algorithms like collaborative filtering and content-based filtering to offer personalized suggestions. Despite their prevalence, these systems face challenges in personalization, often producing generic recommendations due to an overreliance on aggregate data and explicit user feedback. Technical issues such as the cold start problem, data sparsity, and scalability further limit the effectiveness of these systems. Moreover, traditional approaches may not adequately cater recommendations to the specific tastes of a diverse audience, leading to a mismatch between suggested content and user expectations. Many of these recommendation systems use generative artificial intelligence (GenAI), which often functions as a "black box" to users, and generally does not allow modification of its algorithms to improve personalization. Accordingly, improving personalization becomes a technical challenge to be solved in spite of the lack of access to a GenAI model's internal workings.

There is a significant need for an automated recommendation system that overcomes these drawbacks, providing enhanced personalization, better scalability, and privacy-conscious operation, all while effectively catering content to the individual user. Accordingly, there is a need for systems and methods that address the deficiencies of the aforementioned conventional approaches.

SUMMARY

As the use of GenAI becomes more prevalent within the machine learning community, systems that are GenAI model agnostic and further configured to communicate with multiple different GenAI models are needed. As it relates to recommendation systems, there are many existing solutions. Among them one can find content-based systems, collaborative filtering ("people who buy this also buy that") methods, as well as deep neural networks and classic machine learning (ML) models. GenAI's unique performance drives users to use its power for creating recommendations based on outputs from recommendations systems.

However, conventional approaches for leveraging GenAI performance by recommendation systems have several drawbacks. As with many machine learning problems, one drawback is that it is difficult to infer why recommendation systems predict that one text is better (i.e., more relevant) than another for a specific user. As an example, it can be challenging to quantify why one text can be perceived as "happier" than another for a particular user, as there is no metric that measures the level of such happiness. Further still, even if a recommendation system model can quantify happiness and also rank text based on its levels of happiness, that ranking has no bearing on how a GenAI model will interpret the recommendation systems output and thereby generate text with certain levels of happiness. As such, since there is no common metric for measuring happiness between the recommendation system and the GenAI model, the GenAI model may generate text with very different levels of happiness than that initially required by the recommendation system.

Another drawback arises during the conventional processes for causing a GenAI model that is integrated with a machine learning model (e.g., recommendation system), to generate custom recommendations. For example, one conventional approach to implementing GenAI generated text may require fine-tuning the GenAI model itself (e.g., Chat GPT1, GPT3, GPT4, etc.) to perform better with the machine learning model. Fine tuning the GenAI model can be particularly challenging if the GenAI model is maintained by an entity external from the one that manages the machine learning model. Further, this approach can lead to inefficiencies as it relates to computational resources, since the GenAI model would have to be fine-tuned as each new iteration is released. Another more manual approach to generating customer recommendations via a GenAI model may require iteratively leveraging prompts to request that the GenAI model produce similar outputs across several requests (e.g., "generate text like this one"). This approach is far from an ideal method for generating custom recommendations, especially in computing environments configured to serve thousands to millions of users in an automated fashion. Thus, as one having ordinary skill in the art can appreciate, such conventional approaches lack an easy and consistent way to leverage and describe a machine learning model (e.g., recommendation system) output.

In contrast, embodiments described herein can combine existing machine learning solutions with the capabilities of GenAI without retraining the GenAI model or manually generating prompts. For example, by integrating a recommendation system with a neural network and a GenAI model, the collective system can be used to consistently mass produce personalized and relevant content for users based on their preferences and past interactions.

As the most common usage of GenAI at present is generating text, in a non-limiting capacity, the following description will focus on synchronizing recommendation systems to generate text. Nevertheless, this system can be used also for other stimuli such as images and audio.

DETAILED DESCRIPTION OF SEVERAL EMBODIMENTS

As discussed above, conventional recommendation systems generate media and then determine who the media would be relevant to (i.e., what users should receive it). In contrast, embodiments described herein can take media and generate custom variations of the media, such that the custom media is tailored and thereby relevant to each user.

Figure 1:
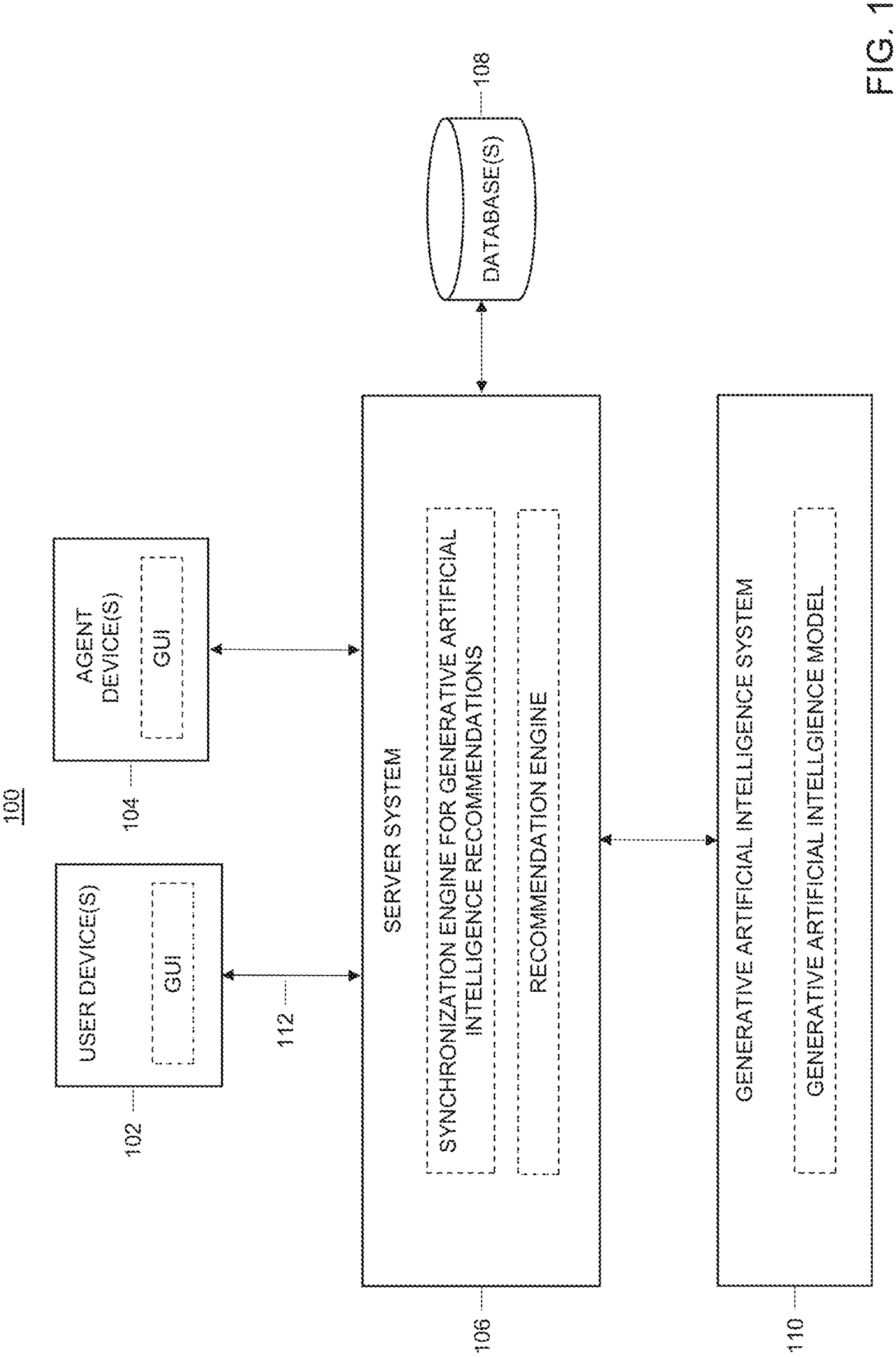
FIG. 1 illustrates an example system configured to implement synchronization for generative artificial intelligence recommendations according to an embodiment of the present disclosure.

FIG. 1 illustrates an example system configured to implement synchronization for generative artificial intelligence recommendations according to an embodiment of the present disclosure. Computing environment 100 may include one or more user device(s) 102, a server system 106, one or more database(s) 108, and/or one or more agent device(s) 104, communicatively coupled to the server system 106. The user device(s) 102, one or more agent device(s) 104, server system 106, and database(s) 108 may be configured to communicate through network 112.

In one or more embodiments, user device(s) 102 is operated by a user. User device(s) 102 may be representative of a mobile device, a tablet, a desktop computer, or any computing system having the capabilities described herein. Users may include, but are not limited to, individuals such as, individuals, employees, companies, prospective clients, and/or customers of an entity associated with server system 106, such as individuals who are utilizing the services of, or consultation from, an entity associated with that document and server system 106.

User device(s) 102 according to the present disclosure may include, without limit, any combination of mobile phones, smart phones, tablet computers, laptop computers, desktop computers, server computers or any other computing device configured to capture, receive, store and/or disseminate any suitable data. In some embodiments, a user device(s) 102 includes a non-transitory memory, one or more processors including machine readable instructions, a communications interface which may be used to communicate with the server system (and, in some examples, with the database(s) 108), a user input interface for inputting data and/or information to the user device and/or a user display interface for presenting data and/or information on the user device. In some embodiments, the user input interface and the user display interface are configured as an interactive graphical user interface (GUI). In some embodiments, the user device(s) 102 are configured to provide the server system 106, via the interactive GUI, input information such a user actions (e.g., queries, text, and/or media) for further processing. In some embodiments, the interactive GUI is hosted by the server system 106 or provided via a client application operating on the user device. In some embodiments, a user operating the user device(s) 102 may query server system 106 for information related to a service provided by an entity hosting server system 106.

In one or more embodiments, each agent device(s) 104 is operated by a user under the supervision of the entity hosting and/or managing server system 106. Agent device(s) 104 may be representative of a mobile device, a tablet, a desktop computer, or any computing system having the capabilities described herein. Users of the agent device(s) 104 can include, but are not limited to, individuals such as, for example, software engineers, database administrators, employees, and/or customer service agents, of an entity associated with server system 106.

Agent device(s) 104 according to the present disclosure can include, without limit, any combination of mobile phones, smart phones, tablet computers, laptop computers, desktop computers, server computers or any other computing device configured to capture, receive, store and/or disseminate any suitable data. In some embodiments, each agent device(s) 104 includes a non-transitory memory, one or more processors including machine readable instructions, a communications interface that may be used to communicate with the server system (and, in some examples, with database(s) 108), a user input interface for inputting data and/or information to the user device and/or a user display interface for presenting data and/or information on the user device. In some examples, the user input interface and the user display interface are configured as an interactive GUI. In some embodiments, the agent device(s) 104 are configured to provide the server system 106, via the interactive GUI, input information (e.g., queries, code, media, and the like) for further processing. In some examples, the interactive GUI may be hosted by the server system 106 or it may be provided via a client application operating on the user device.

The server system 106 can include one or more processors, servers, databases, communication/traffic routers, non-transitory memory, modules, and interface components. In one or more embodiments, server system 106 hosts, stores, and operates a synchronization engine for creating generative artificial intelligence recommendations and a recommendation engine for creating and manipulating recommendations. Server system 106 may be configured for receiving a user ID and item; generating a profile vector associated with the user ID and item, wherein the profile vector includes data indicative of one or more tones and one or more emotions; translating the data to a vector description; generating training profile vectors based on the profile vector; translating the training profile vectors into one or more training vector descriptions; generating one or more training prompts based on the training vector descriptions; generating, via a generative artificial intelligence model, one or more training items based on the one or more training prompts; inputting, the one or more full texts as input and the training profile vectors as labels, into a natural language processing model that includes a synchronization layer; minimizing the difference between the training profile vectors and output from the synchronization layer, such that the natural language processing model is optimized for a user associated with the user ID; and generating one or more unique items using the natural language processing model that is optimized for the user.

Moreover, the server system 106 may include security components capable of monitoring user rights and privileges associated with initiating API requests for accessing the server system 106 and modifying data in database(s) 108. Accordingly, the server system 106 may be configured to manage user rights, manage access permissions, manage object permissions, and/or the like. The server system 106 may be further configured to implement two-factor authentication, secure sockets layer (SSL) protocols for encrypted communication sessions, biometric authentication, token-based authentication, and/or the like.

Database(s) 108 may be locally managed, and/or may be a cloud-based collection of organized data stored across one or more storage devices. Database(s) 108 may be complex and developed using one or more design schema and modeling techniques. Database(s) 108 may be hosted at one or more data centers operated by a cloud computing service provider. Database(s) 108 may be geographically proximal to or remote from the server system 106 and is configured for data dictionary management, data storage management, multi-user access control, data integrity, backup and recovery management, database access language application programming interface (API) management, and/or the like. Database(s) 108 may be in communication with server system 106, end user device(s) 102, and agent device(s) 104, generative artificial intelligence system 110 via network 112.

Database(s) 108 stores various data, including training data (e.g., a corpus of queries, documents, and/or text) that can be modified and leveraged by server system 106 and agent device(s) 104. Various data in the database(s) 108 will be refined over time using via components in computing environment 100. Additionally, database(s) 108 may be deployed and maintained automatically by one or more components shown in FIG. 1.

The generative artificial intelligence system 110 can include one or more processors, servers, databases, communication/traffic routers, non-transitory memory, modules, and interface components, configured to maintain and operate a generative artificial intelligence model. The generative artificial intelligence model may be configured to generate new content, such as text, images, music, or code, in response to prompts and based on its training data. The generative artificial intelligence model may be further configured to implement deep learning techniques, interact with users, and understand context and nuance of the prompts it receives and the training data it is trained on.

Network 112 may be of any suitable type, including individual connections via the Internet, cellular or Wi-Fi networks. In some embodiments, network 112 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, LAN, or the Internet. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

In some embodiments, communication between the elements may be facilitated by one or more application programming interfaces (APIs). APIs of server system 106 may be proprietary and/or may be examples available to those of ordinary skill in the art such as Amazon® Web Services (AWS) APIs or the like.

Figure 2:
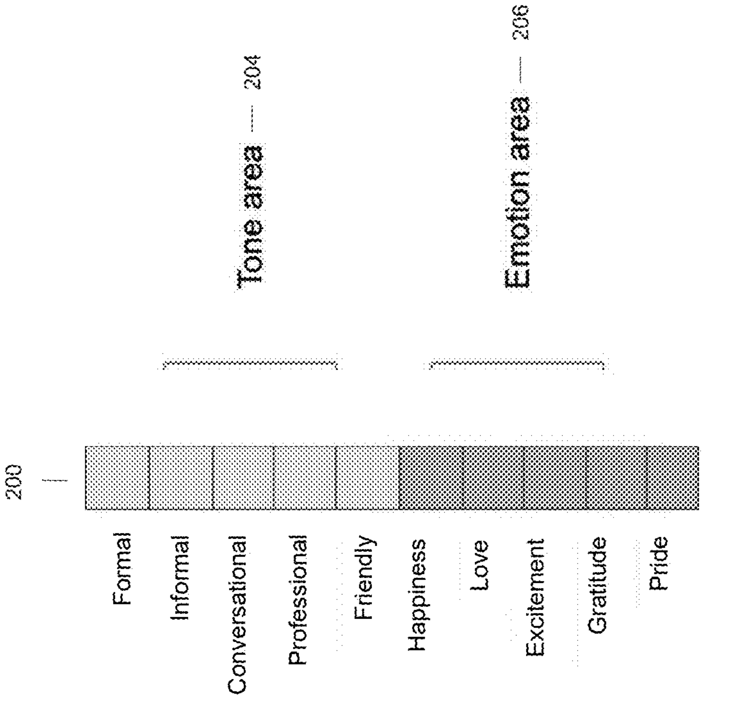
FIG. 2 illustrates a profile vector according to an embodiment of the present disclosure.

FIG. 2 illustrates a profile vector 200 according to an embodiment of the present disclosure. Server system 106 may be configured to receive or access a user identification (user ID) and an item (e.g., code and/or media including but not limited to text, audio, or an image) associated with a specific user. The user ID and item may be accessed from a recommendation system associated with server system 106. Server system 106 may be configured to convert the item into an embedding (e.g., an array), that is, a profile vector 200 including one or more cells, as depicted in FIG. 2. The profile vector 200 may include one or more areas for representing tone (e.g., in tone area 204) and emotion (e.g., in emotion area 206).

Figure 3:
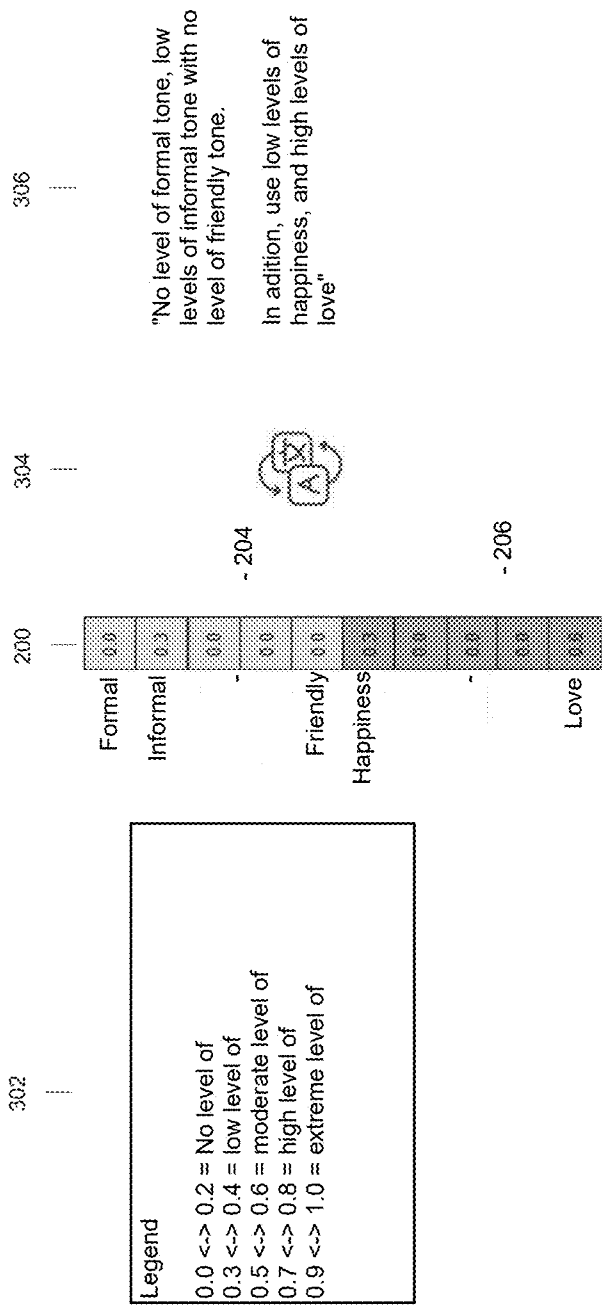
FIG. 3 illustrates a profile vector and vector translator according to an embodiment of the present disclosure.

FIG. 3 illustrates a profile vector and vector translator according to an embodiment of the present disclosure. As depicted, each cell in the profile vector 200 may have a corresponding intensity value that may be numerical and indicates an intensity associated with a tone or emotion. The intensity may range from 0.0 to 1.0 and may be translated into words via vector translator 304, as shown in legend 302. In a non-limiting capacity, 0.0 to 0.2 may indicate no level of a tone or emotion, 0.3 to 0.4 may indicate low levels or a tone or emotion, 0.5 to 0.6 may indicate moderate levels of a tone or emotion, 0.7 to 0.8 may indicate high levels of a tone or emotion, and 0.9 to 1.0 may indicate extreme levels of a tone or emotion. For example, in tone area 204, profile vector 200 has 0.0 levels of formal tone (i.e., no formal tone), 0.3 levels of informal tone (i.e., low levels of informal tone), 0.3 levels of happiness (i.e., low levels of happiness), 0.6 levels of love (i.e., high levels of love). The aforementioned intensity levels may be translated to vector description 306 by vector translator 304 that may subsequently be used to generate a prompt.

Figure 4:
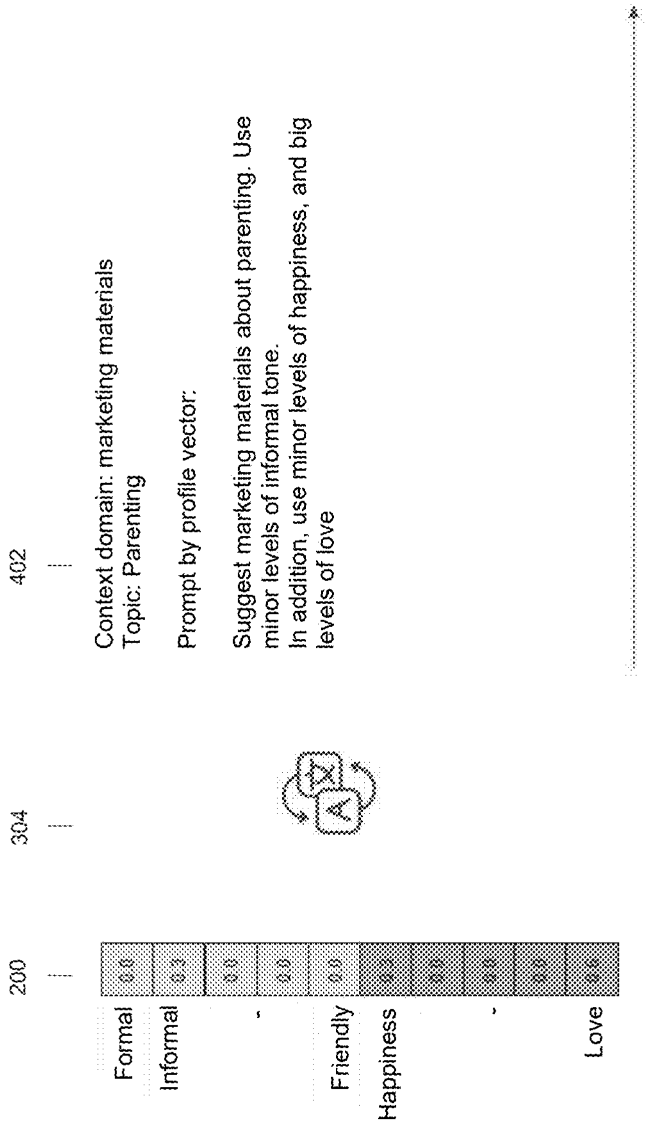
FIG. 4 illustrates a profile vector, vector translator, and prompt according to an embodiment of the present disclosure.

FIG. 4 illustrates a profile vector, vector translator, and prompt according to an embodiment of the present disclosure. As discussed in relation to FIG. 3, vector translator 304 can automatically analyze the intensity value of tone and emotion in profile vector 200 to generate a vector description (e.g., in a textual format). Further, the vector description 306 can be used to generate generative artificial intelligence prompts 402. Generative artificial intelligence prompts 402 may be instructions for a GenAI model to create one or more items (e.g., code and/or media including but not limited to text, audio, or an image). As depicted in FIG. 4, generative artificial intelligence prompts 402 may include information and/or instructions related to the context, topic, and intensity of emotion and tone of the requested item.

Figure 5:
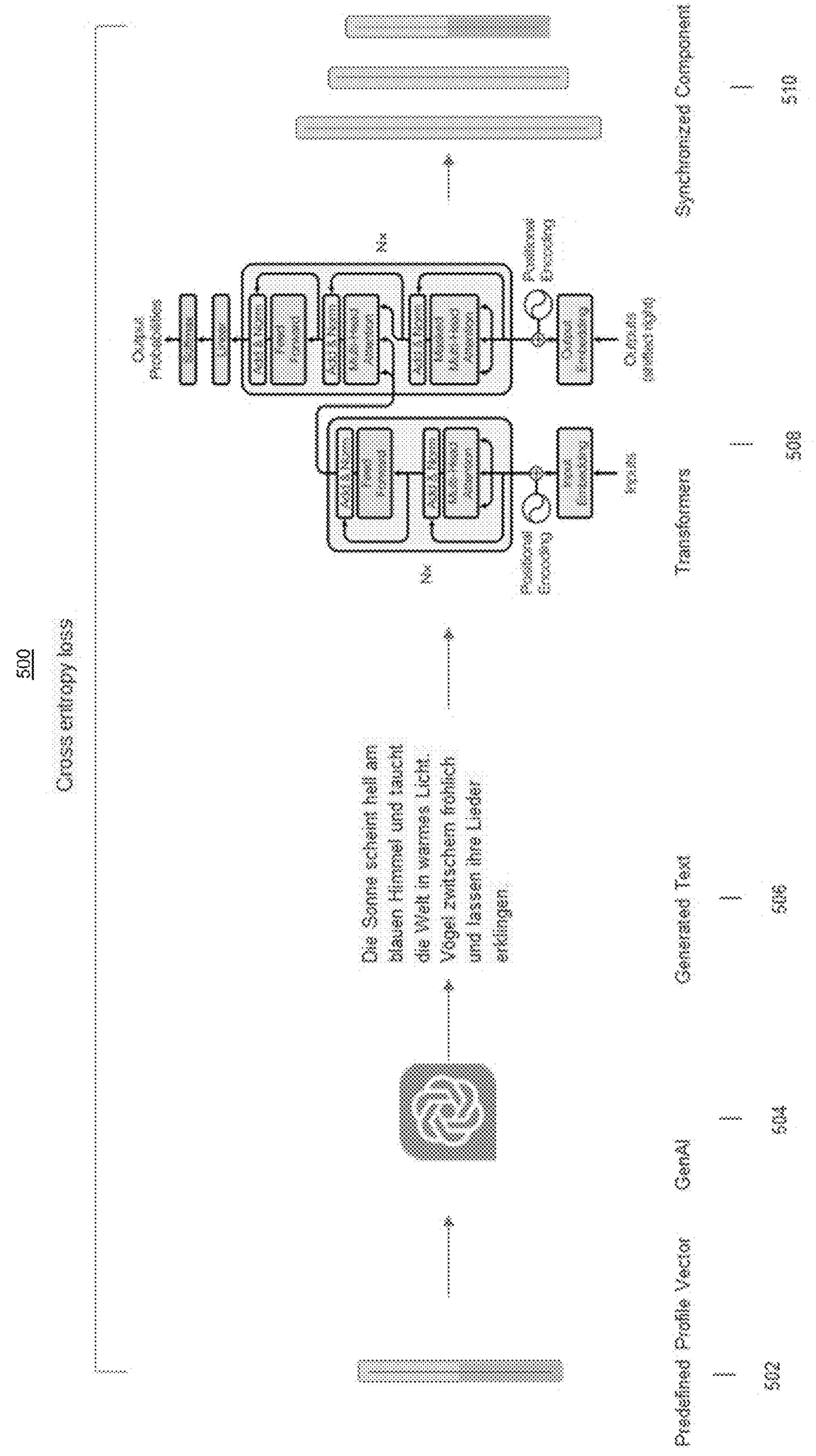
FIG. 5 illustrates a synchronization network according to an embodiment of the present disclosure.

FIG. 5 illustrates a synchronization system 500 according to an embodiment of the present disclosure. The components discussed in relation to FIGS. 2-4 may be leveraged to train synchronization system 500. In some embodiments training synchronization system 500 may initially include generating a training dataset using the profile vector 200, vector translator 304, and GenAI model. The training dataset may be created by generating multiple training profile vectors 502 (similar to profile vector 200) with random values ranging from 0.0 to 1.0 in their cells. The number of training profile vectors 502 that are generated may depend on the size (i.e., the number of cells with emotion and tone intensity values) of profile vector 200. For example, a profile vector 200 having 50 cells may require 5 (the number of intensity levels)×50 (size of the vector)×250 (the number of examples to prevent overfit)=62,500 training examples. The training profile vectors 502 may be unique to the user associated with profile vector 200.

Once the training profile vectors 502 are created, they can be automatically translated using vector translator 304 to create training vector descriptions that may include information such as context, topic, and emotion and tone intensity values, such that the training prompts may include instructions for the GenAI model 504 to generate different items 506 (e.g., code and/or media including but not limited to text, audio, or an image). For example, given the number of initial profile vectors, an equivalent number of GenAI text may be created by the GenAI model 504. Subsequently, in furtherance of training the synchronization system 500, the corresponding generated items 506 (e.g., GenAI created text) may be used as input, and the training profile vectors 502 may be used as labels for a natural language processing transformer 508 (e.g., sBERT and/or RoBERTa).

The natural language processing transformer 508 may be a multilayer transformer configured to generate an embedding (i.e., vector) representation of the items 506. Further, natural language processing transformer 508 may be modified to include an additional synchronized layer, depicted in FIG. 5 as synchronized component 510, which may include one or more layers. The last layer of the synchronized component 510 may be the same size (i.e., have the same number of cells) as the training profile vectors 502. Thereby, the training profile vectors may be used by the synchronization system 500 as output labels for the natural language processing transformer 508 (including the synchronized component 510) to minimize the differences between the labels (i.e., training profile vectors 502) and the output of the synchronized component 510. In some embodiments, one objective of the synchronization system 500 may be to minimize the difference between the labels and last layer of the synchronized component 510, using for example, a loss function (e.g., cross entropy) that determines the difference between labels and the output of the synchronization system 500. Although cross entropy is discussed in the example, in a non-limiting capacity, other functions may be used to measure the difference between the two distributions. Another objective of the synchronization system 500 could be to automatically fine tune itself based on the loss function measurements until the difference between the labels and the synchronization system 500 output are within predetermined thresholds. The result of a synchronization system 500 with a loss value that is within a predetermined threshold, is a synchronization system 500 that may be optimized to receive items (e.g., a text such as a blog) that are relevant to a specific user, to produce a profile vector that can subsequently be used to generate a prompt for a GenAI model (e.g., GenAI model 504) that can modify the item (e.g., rewrite the text or blog) with language that will be tailored to the specific user.

Figure 6:
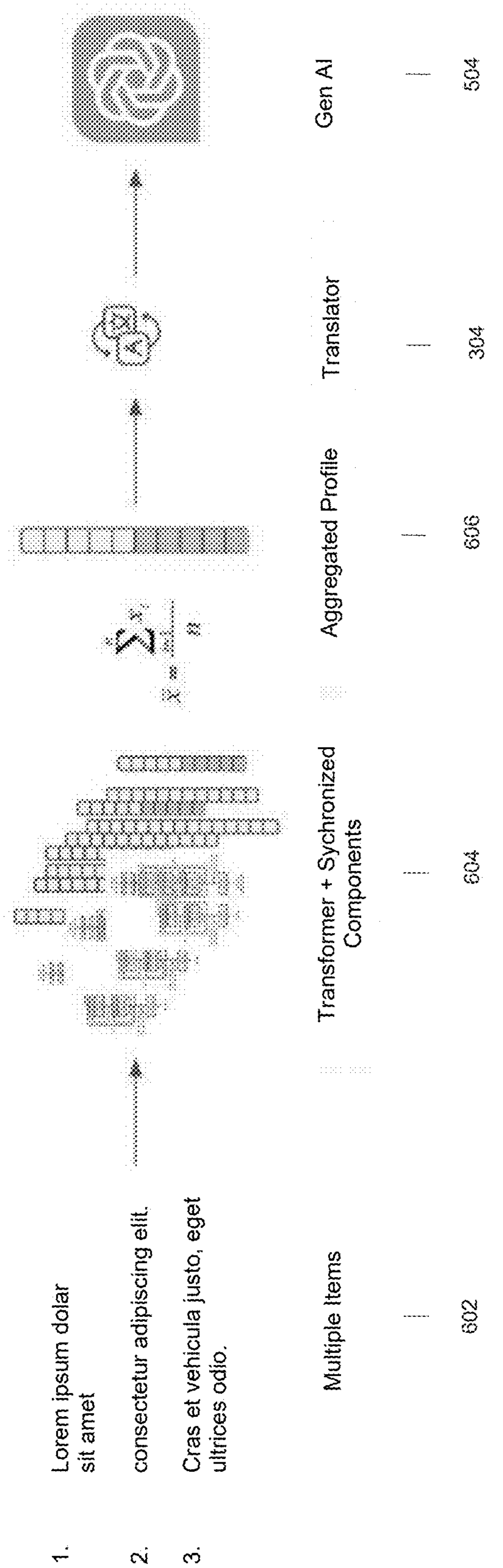
FIG. 6 illustrates a profile-based generative recommender, and prompt according to an embodiment of the present disclosure.

FIG. 6 illustrates a profile-based generative recommender 600 according to an embodiment of the present disclosure. Architecturally, the profile-based generative recommender 600 may include a trained combined natural language processing transformer including a synchronized component 604, an aggregated profile vector 606, vector translator 304, and GenAI model 504. Profile-based generative recommender 600 may be configured to receive multiple items 602 (e.g., code and/or media including but not limited to text, audio, or an image) that are relevant to a specific user and generate new or modified versions of the multiple items 602 such that the multiple items 602 are tailored, that is, include language with emotion and tone that appealing to) the specific user. For example, server system 106 can receive one or more predictions of items for a user. These items and the user's ID are fed into the profile-based generative recommender 600. Here, each item can automatically cause the profile-based generative recommender 600 to generate a recommendation (e.g., a GenAI generated item) that is tailored to the user. In some instances, the profile-based generative recommender 600 may be configured (e.g., include a natural language processing transformer 508 a synchronized component 510 that are configured) to a specific user ID and profile vector associated with an item profile (e.g., text for a blog).

Alternatively, in other instances, the profile-based generative recommender 600 may be configured (e.g., include a natural language processing transformer 508 a synchronized component 510 that are configured) to a specific user ID and aggregated profile vector 606 that is associated with multiple item profiles (e.g., text for a blog, movie interest, music preferences, and/or favorited images). Here, the aggregated profile vector 606 may be an average of every (or some) profile vectors associated with a specific user. The profile-based generative recommender 600 can be configured such that instead of the aggregated profile vector 606 being an average of every profile vector associated with a user, it could be median, mode, or any measurement that summarizes or skews the profiles vectors associated with a specific user to achieve an objective of the profile-based generative recommender 600.

Figure 7:
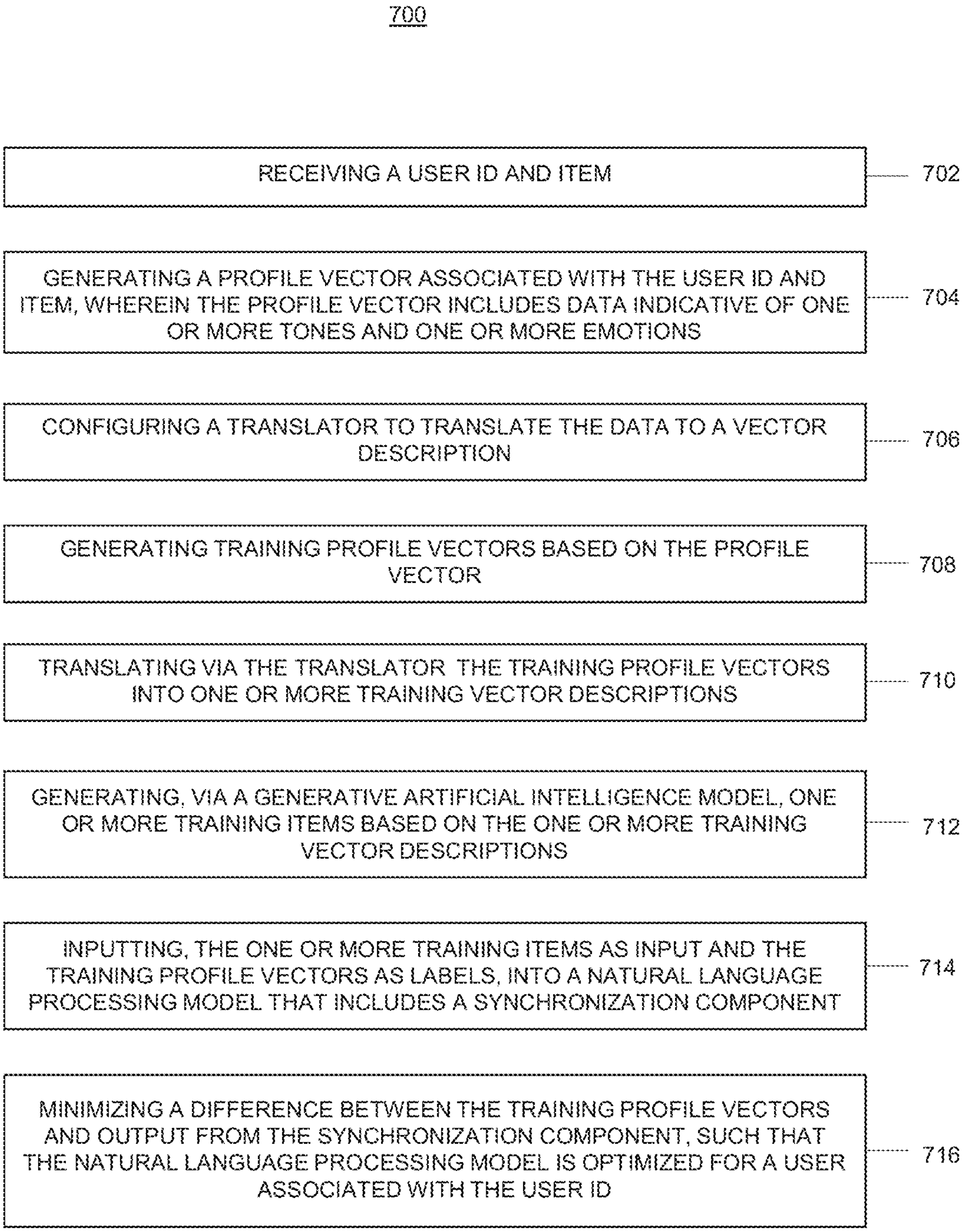
FIG. 7 illustrates a computer implemented method for training a synchronization system according to an embodiment of the present disclosure.

FIG. 7 illustrates a computer implemented method for training a synchronization system and generating unique recommendations 700 according to an embodiment of the present disclosure. As depicted in FIG. 7, server system 106 may be configured for receiving a user ID and item from a recommendation system, at 702. Although, FIG. 1 depicts the recommendation engine (a component that may manage, maintain, and operate instructions related to the recommendation system) as being an internal component of server system 106, in some embodiments the recommendation engine and recommendation system may be external to server system 106. Server system 106 may be agnostic to the recommendation system, such that it can be trained to work with any recommendation system. As discussed in relation to FIGS. 1-2, server system 106 may receive or access the user ID and item from a recommendation system. In some embodiments the user ID is a profile associated with a user or token or code that represents the composition of user profile. The user profile may include data that indicates user interests or preferences as it relates to items. As discussed, items may be one or more of code, images, text, and audio. The recommendation system may store data related to user interests and preferences related to items and generate predictions for items that the user may be interested in receiving in real-time, while accessing computing environment 100, or in the future.

At 704, server system 106 may further be configured for generating a profile vector associated with the user ID and item, wherein the profile vector includes data indicative of one or more tones and one or more emotions. Given that the item may be known as text, code, or media that the user prefers, server system 106 may be configured to convert the item into a profile vector 200 (e.g., an array) that represents the format in which a specific user prefers an item to be composed. The profile vector 200 may capture the user's preferences by having intensity values assigned to its cells. In non-limiting example, a profile vector 200 may capture the tone and emotion conveyed in a text (i.e., an item). The number of cells dedicated to each element (tone or emotion) may be divided from 1.0 in order create a range for intensity values. For example, if 5 cells are dedicated to tone and 5 cells to emotion, dividing 1.0 by 5 would create a range with a scale of 0.0-0.2, 0.3-0.4, 0.5-0.6, 0.7-0.8, and 0.9-1.0 for each element. Although this example is discussed in relation to emotion and tone, this invention is not limited to these elements, as other categories may be used, such as, demographics, software types, and file types, and the like. Referring back to the intensity values, each range may be associated with description. For example, as discussed in relation to FIG. 2, range 0.0-0.2 may be associated with no levels of emotion or tone, whereas range 0.9-1.0 may be associated with extreme levels of emotion or tone.

At 706, server system 106 may further be configured for configuring a vector translator 304 to translate the data to a vector description 306. Here, once the intensity ranges are established, server system 106, via vector translator 304, may be configured to translate the intensity values to their corresponding descriptions within their range. For example, determining that one cell associated with the emotion love is assigned a value of 0.6, server system 106 may be configured to translate the value of 0.6 to moderate levels of love, via vector translator 304. The vector translator 304 may be configured to determine which cells have intensity values and translate those accordingly.

At 708, server system 106 may be configured for generating training profile vectors 502 based on the profile vector 200. In furtherance of training a synchronization system 500 to generate unique recommendations (i.e., items 506), server system 106 may generate a dataset of training profile vectors 502 that can be used by the synchronization system 500 as labels. As discussed in relation to FIG. 5, the number of training profile vectors 502 that are generated may depend on the size (i.e., the number of cells with emotion and tone intensity values) of profile vector 200. As such, training profile vectors 502 related to one or more different item 506 types may be generated. For example, training profile vectors 502 related to text for invoicing, text for websites, images for search results, audio for virtual assistants, and/or images for movies may be generated.

At 710, once created, the vector translator 304 may separately translate each of the training profile vectors 502 and their corresponding intensity values to create training vector descriptions and subsequently create separate generative artificial intelligence prompts 402 that are fed into GenAI model 504. For example, for each training profile vectors 502 that is created, the vector translator 304 may parse its array cells to determine its assigned intensity levels, and which element (e.g., emotion or tone) the intensity level is associated with to generate vector descriptions 306 and generative artificial intelligence prompts 402.

At 712, in response to receiving the generative artificial intelligence prompts 402, server system 106 may be configured for generating, via GenAI model 504, different items 506 (e.g., code and/or media including but not limited to text, audio, or an image) for each of the separate training profile vectors 502 and their corresponding generative artificial intelligence prompts 402. The training profile vectors 502 and items 506 may be fed to synchronization system 500 and used as labels and input, respectively. For example, as discussed in relation to FIG. 5, synchronization system 500 may include a natural language processing transformer 508 with an additional synchronization layer (i.e., synchronized component 510) and the natural language processing transformer 508 may receive the generated items 506 as input.

At 714, in response to receiving the items 506 as input, natural language processing transformer 508 may convert the items 506 into embeddings at the synchronized component 510.

At 716, server system 106 may be configured for minimizing a difference between the training profile vectors and output from the synchronization component, such that natural language processing model is optimized for a user associated with the user ID. The synchronization system 500 may be configured to implement a loss function (e.g., cross entropy loss), such that a loss value that represents the difference between the training profile vectors 502 (which are used as comparative output labels) and the synchronization system 500 output can be calculated. Here, by comparing the loss value to a predetermined threshold, it can be determined by server system 106 whether the synchronization system 500 needs additional training, or if the loss value has been adequately trained. Calculating the loss value may additionally involve a comparing the intensity values between the training profile vectors 502 and the embedding output of the synchronization system 500. Training the synchronization system 500 may involve iteratively performing steps 712-714 until the loss value is at an acceptable value (e.g., meeting or within acceptable range of a predetermined threshold).

Additionally, training the synchronization system 500 may be implemented for each user (e.g., millions to billions of users) associated with computing environment 100 that may receive GenAI generated recommendation items, such that synchronization system 500 may be optimized to generate GenAI recommendations items that may be appealing to each specific user. Further, computing environment 100 and synchronization system 500 are GenAI model 504 agnostic, such that the components in computing environment 100, in particular, synchronization system 500 can be trained to generate GenAI recommendations items with any GenAI model 504 or version of a specific GenAI model 504.

Figure 8:
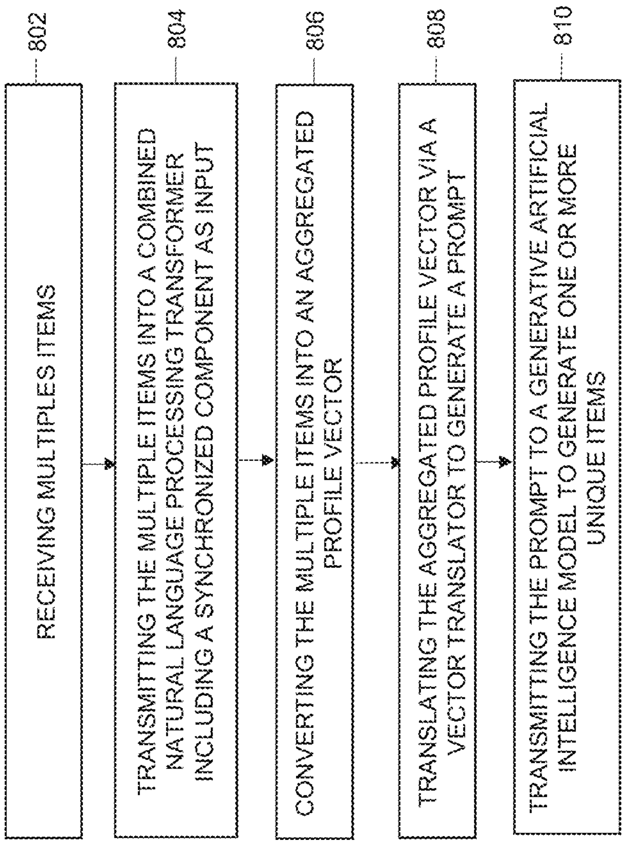
FIG. 8 illustrates a computer-implemented method for implementing a profile-based generative recommender, according to an embodiment of the present disclosure.

FIG. 8 illustrates a computer-implemented method for implementing a profile-based generative recommender 800, according to an embodiment of the present disclosure. Once the combined natural language processing transformer including the synchronized component 604 is trained, the Server system 106 may be configured to generate GenAI model recommendations items that are tailored to a specific user.

In furtherance of generating GenAI model recommendation items, server system 106 may be configured to receive or access multiple items 602 from determined by the recommendation system as being relevant of potential interest to one or more specific users, at 802. As a non-limiting example, a website may be published and identified by the recommendation system as an item that should be recommended to two users (e.g., user 1 and user 2).

At 804, server system 106 may be configured for transmitting the multiple items 602 into the combined natural language processing transformer including the synchronized component 604 as input. For example, continuing with the website example above, the code and media associated with the website may be fed into combined natural language processing transformer including the synchronized component 604 as input.

At 806, server system 106 may be configured for converting the multiple items 602 into an aggregated profile vector 606. Converting the multiple items 602 into an aggregated profile vector 606 by converting each individual item into a profile vector 200 then calculating the average of the intensity values for each cell, such that the aggregated profile vector 606 may be composed of intensity values that represent the average of a given emotion or tone across each profile vector 200 used in the calculation. Alternatively, the aggregated profile vector 606 may instead represent one item and therefore be composed of a single profile vector and therefore not an average of multiple profile vectors. Further still, the aggregated profile vector 606 may instead represent an average of some of the items, but not all of the items that are inputted into the combined natural language processing transformer including the synchronized component 604. As an example, the combined natural language processing transformer including the synchronized component 604 may convert the website into an aggregated profile vector 606. In the instance where user 1 or user 2 had previously been recommended items that were converted into profile vectors, separately for each user, the server system 106 may sum the profile vector associated with website and the user's previously generated profile vectors and calculate the average of that sum to generate the aggregated profile vector 606. Following the website example, the combined natural language processing transformer including the synchronized component 604 would have been trained specifically for each user (i.e., user 1 and user 2) and would separately generate the aggregated profile vector 606 for each user.

At 808, server system 106 may be configured for translating the aggregated profile vector 606 via vector translator 304 to generate a prompt. Here, server system 106 may feed the aggregated profile vector 606 to a vector translator 304 to generate a vector description 306 that may subsequently be used to generate a prompt. Here, the vector translator 304 may parse and analyze the intensity values in the cells of the aggregated profile vector and associate the intensity values with their corresponding description in their range as discussed in relation to FIG. 7. Responsively, server system 106 may use the vector description 306 to generate a prompt for a GenAI model 504, wherein the prompt may include instructions that include information related to the context, topic, and intensity of emotion and tone of the requested item. For example, the website's aggregated profile vector 606 may be fed to the vector translator 304, wherein each of its cells are parsed and analyzed for intensity values. The intensity values may be converted into a vector description 306 and further converted by the vector translator 304 to prompt that includes the context of the website (e.g., a website directed to discussing machine learning), the topics of the website (e.g., deep learning, artificial intelligence, natural language processing), and the vector descriptions of the intensity of the elements (e.g., emotion and tone) determined from the aggregated profile vector 606 cells.

At 810, server system 106 may be configured for transmitting the prompt to a GenAI model 504 to generate one or more unique items. Here, server system 106 may transmit the prompt to the GenAI model 504 that the synchronization system 500 and now trained combined natural language processing transformer including the synchronized component 604 are configured to work with. In response to receiving the prompt, the GenAI model 504 may generate unique items (e.g., recommendations) composed of context, topics, and emotion and tone that would appeal to the user associated with the user at 802. For example, in response to transmitting the prompt associated with the website to the GenAI model 504, the GenAI model 504 may generate a unique, modified version of the website that includes topics, text, and images, that are tailored to each user (i.e., user 1 and user 2). Although the initial multiple items 602 (i.e., the website) that were recommended at 802 may have composed in a first format, at 810 the GenAI model 504 will generate a website that may be composed in a second format that user 1 would find relevant and appealing, and a third format that user 2 would find relevant and appealing. Here, server system 106 may transmit or provide access to the website to user 1 and user 2 via user device(s) 102, and each of their separate user device(s) 102 user 1 and user 2 would be able to view and interact with slightly different versions of the GenAI generated website such that the content of the website is relevant and appealing to them. Further, steps 802-810 may be implemented in real-time and/or in response to a trigger (e.g., user device(s) 102 accessing computing environment 100 or server system 106 transmitting a recommendation to user device(s) 102).

Figure 9:
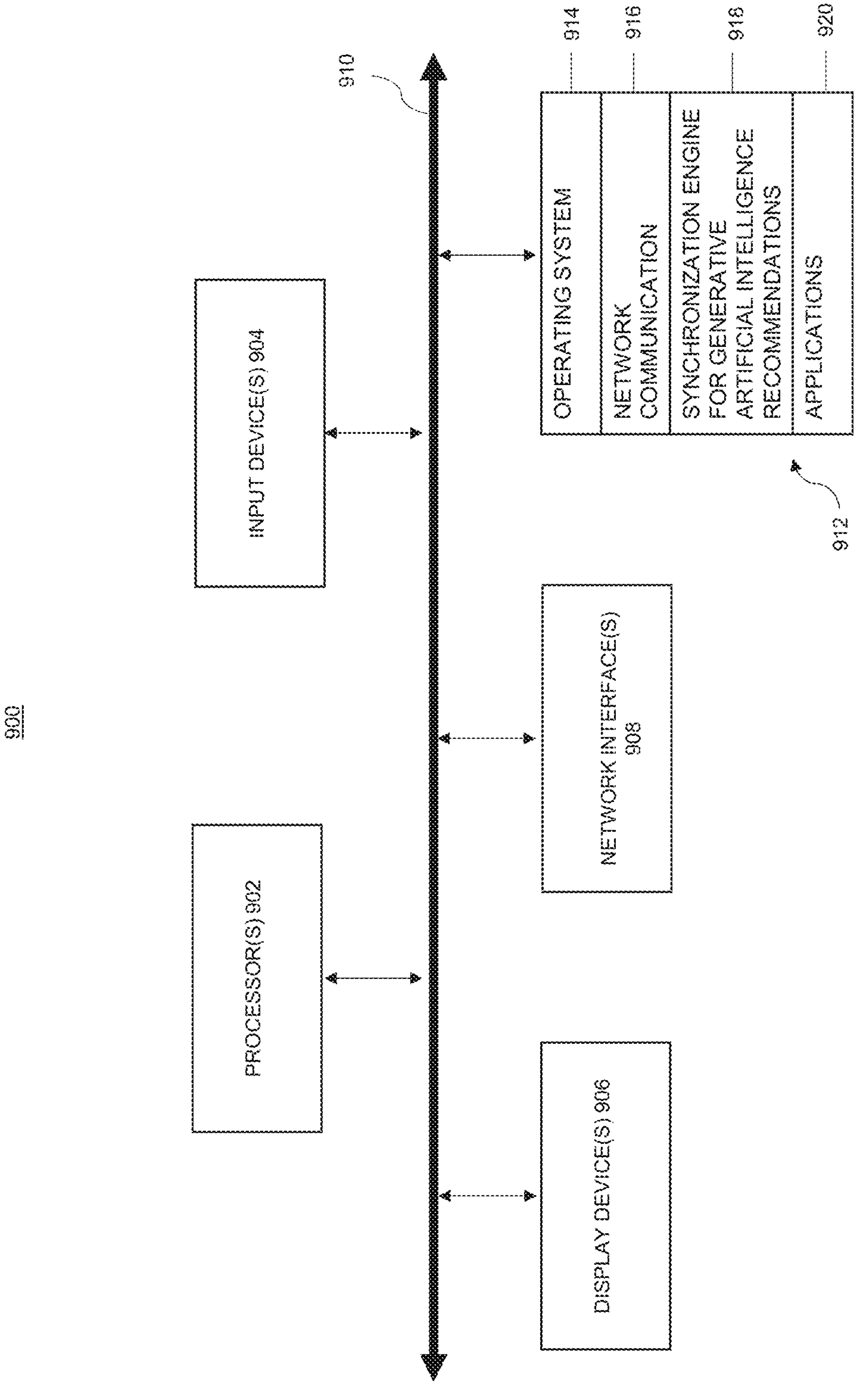
FIG. 9 illustrates an example computing device according to an embodiment of the present disclosure.

FIG. 9 illustrates a block diagram for a computing device, according to various embodiments of the present disclosure. For example, computing device 900 may function as server system 106. The computing device 900 may be implemented on any electronic device that runs software applications derived from compiled instructions, including without limitation personal computers, servers, smart phones, media players, electronic tablets, game consoles, email devices, etc. In some implementations, the computing device 900 may include processor(s) 902, (one or more) input device(s) 904, one or more display device(s) 906, one or more network interfaces 908, and one or more computer-readable medium(s) 912 storing software instructions. Each of these components may be coupled by bus 910, and in some embodiments, these components may be distributed among multiple physical locations and coupled by a network 112.

Display device(s) 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device(s) 904 may be any known input device technology, including but not limited to a keyboard (including a virtual keyboard), mouse, track ball, camera, and touch-sensitive pad or display. Bus 910 may be any known internal or external bus technology, including but not limited to ISA, EISA, PCI, PCI Express, USB, Serial ATA or FireWire. Computer-readable medium(s) 912 may be any non-transitory medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium(s) 912 may include various instructions for implementing an operating system 914 (e.g., Mac OS®, Windows®, Linux). The operating system may be multi-user, multiprocessing, multitasking, multithreading, real-time, and the like. The operating system may perform basic tasks, including but not limited to: recognizing input from input device(s) 904; sending output to display device(s) 906; keeping track of files and directories on computer-readable medium(s) 912; controlling peripheral devices (e.g., disk drives, printers, etc.) which can be controlled directly or through an I/O controller; and managing traffic on bus 910. Network communications instructions 916 may establish and maintain network connections (e.g., software for implementing communication protocols, such as TCP/IP, HTTP, Ethernet, telephony, etc.).

Synchronization engine for generative artificial intelligence recommendations 918 may include instructions that enable computing device 900 to implement one or more methods as described herein. Application(s) 920 may be an application that uses or implements the processes described herein and/or other processes. The processes may also be implemented in operating system 914. For example, application(s) 920 and/or operating system 914 may execute one or more operations to intelligently generate unique recommendations via one or more natural language processing and/or machine learning algorithms.

The described features may be implemented in one or more computer programs that may be executable on a programmable system including at least one programmable processor coupled to receive data and instructions from, and to transmit data and instructions to a data storage system (e.g., database(s) 108), at least one input device, and at least one output device. A computer program is a set of instructions that can be used, directly or indirectly, in a computer to perform a certain activity or bring about a certain result. A computer program may be written in any form of programming language (e.g., Janusgraph, Gremlin, Sandbox, SQL, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

It is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system comprising:

at least one processor; and at least one non-transitory computer readable medium storing instructions that, when executed by the at least one processor, cause the at least one processor to perform processing comprising:

receiving a user ID and an item;

generating a profile vector associated with the user ID and the item, wherein the profile vector includes data indicative of one or more tones and one or more emotions;

configuring a translator to translate the data;

generating training profile vectors by determining at least a number of cells in the profile vector assigned intensity values associated with the of one or more tones and the one or more emotions, wherein the profile vector includes an array of cells, wherein each cell is assigned a numerical value associated with an intensity value of either the one or more tones or the one or more emotions;

translating, via the translator, the training profile vectors into one or more training vector descriptions;

generating one or more training prompts that include data from the one or more training vector descriptions, wherein the one or more training vector descriptions represent the numerical value associated with the intensity value in textual form;

generating, via a generative artificial intelligence model, one or more training items responsive to the one or more training prompts;

inputting, the one or more training items as input and the training profile vectors as labels, into a natural language processing model that includes a synchronization component; and adjusting the natural language processing model to minimize a difference between the training profile vectors and output from the synchronization component and optimize the natural language processing model for a user associated with the user ID.

2. The system of claim 1, wherein the user ID and the item are received from a recommendation system.

3. The system of claim 1, wherein the item is one of: code, text, image, or audio.

4. The system of claim 1, wherein the data is translated to the one or more training vector descriptions via a vector translator.

5. The system of claim 1, wherein a last layer of the synchronization component is composed of the same number of cells as the training profile vectors.

6. The system of claim 1, wherein a cross entropy loss function is used to minimize the difference between the training profile vectors and output from the synchronization component.

7. A system comprising:

at least one processor; and at least one non-transitory computer readable medium storing instructions that, when executed by the at least one processor, cause the at least one processor to perform processing comprising:

receiving multiple items;

transmitting the multiple items into a combined natural language processing transformer including a synchronization component;

converting the multiple items into an aggregated profile vector via the combined natural language processing transformer including the synchronization component, wherein the aggregated profile vector includes an array of cells, wherein each cell is assigned a numerical value associated with an intensity value of either one or more tones or one or more emotions;

translating the aggregated profile vector via a vector translator to generate a prompt, wherein the prompt includes data from one or more vector descriptions representing the numerical value associated with the intensity value in textual form; and transmitting the prompt to a generative artificial intelligence model to generate one or more unique items.

8. The system of claim 7, wherein a user ID and the multiple items are received from a recommendation system.

9. The system of claim 7, wherein the multiple items are one of: code, text, image, or audio.

10. The system of claim 7, wherein the intensity value of either the one or more tones or the one or more emotions are translated to the one or more vector descriptions via the vector translator.

11. The system of claim 7, wherein a last layer of the synchronization component is composed of the same number of cells as the aggregated profile vector.

12. A computer-implemented method comprising:

receiving, by at least one processor, multiple items;

transmitting, by the at least one processor, the multiple items into a combined natural language processing transformer including a synchronization component;

converting, by the at least one processor, the multiple items into an aggregated profile vector via the combined natural language processing transformer including the synchronization component, wherein the aggregated profile vector includes an array of cells, wherein each cell is assigned a numerical value associated with an intensity value of either one or more tones or one or more emotions;

translating, by the at least one processor, the aggregated profile vector via a vector translator to generate a prompt, wherein the prompt includes data from one or more vector descriptions representing the numerical value associated with the intensity value in textual form; and transmitting, by the at least one processor, the prompt to a generative artificial intelligence model to generate one or more unique items.

13. The computer-implemented method of claim 12, wherein a user ID and the multiple items are received from a recommendation system.

14. The computer-implemented method of claim 12, wherein the multiple items are one of: code, text, image, or audio.

15. The computer-implemented method of claim 12, wherein the intensity value of either the one or more tones or the one or more emotions are translated to the one or more vector descriptions via the vector translator.

16. The computer-implemented method of claim 12, wherein a last layer of the synchronization component is composed of the same number of cells as the aggregated profile vector.

* * * * *